Jan. 5, 1960  E. P. ORMSBY  2,919,956
SLIDING WAY FOR MACHINE TOOLS AND METHOD OF MAKING SAME
Filed April 23, 1956
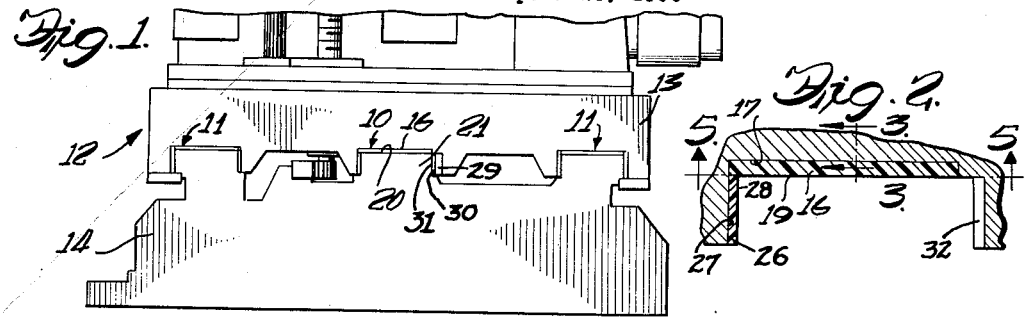
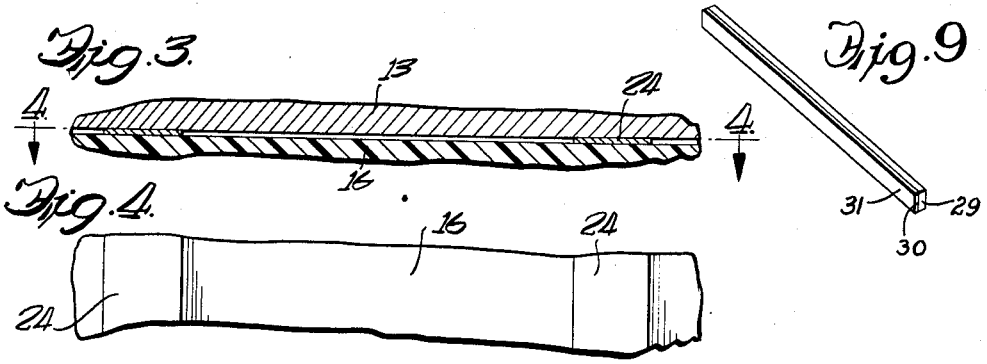
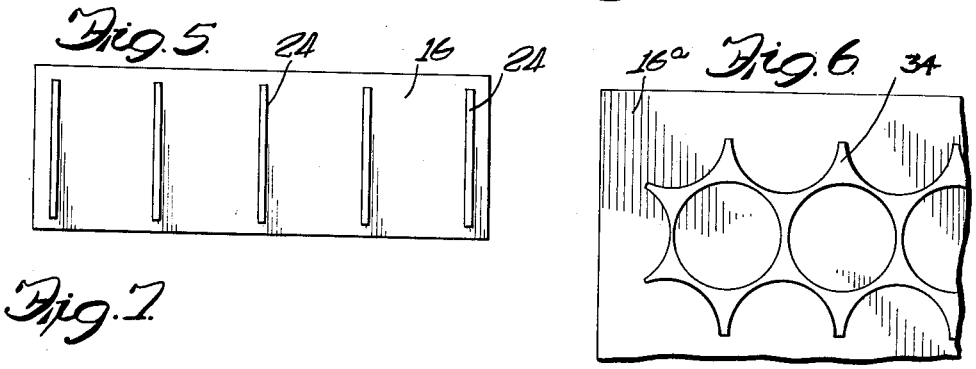
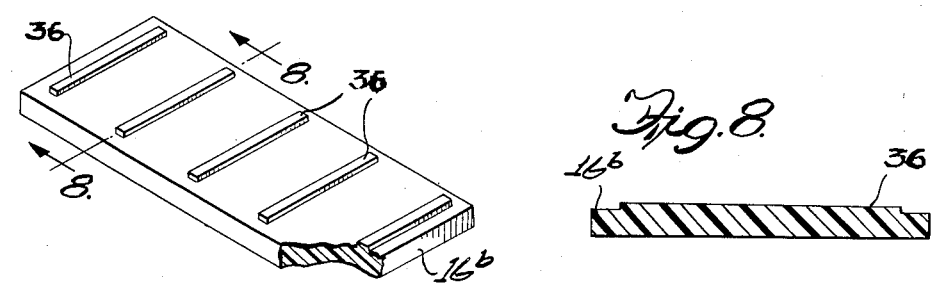
Inventor
Edwin P. Ormsby
Carlson, Pitzner, Hubbard & Wolfe
Attorneys

United States Patent Office 2,919,956
Patented Jan. 5, 1960

2,919,956

SLIDING WAY FOR MACHINE TOOLS AND METHOD OF MAKING SAME

Edwin P. Ormsby, Larmartine, Wis., assignor to Giddings & Lewis Machine Tool Company, Fond du Lac, Wis., a corporation of Wisconsin Application April 23, 1956, Serial No. 579,856

15 Claims. (Cl. 308—3)

The present invention relates in general to machine tool ways and more particularly to such ways of the general type provided with bonded non-metallic wear plates and disclosed in United States Patent No. 2,675,276, issued April 13, 1954, to Jesse Daugherty.

In machine tools of the type having movable members supported and guided in their movements by means of complementary, elongated ways provided on the movable members and their respective supports, it is advantageous to provide relatively soft wear plates attached to one of each pair of complementary ways for sliding engagement with the hard bearing surface on the coacting way. It has been found that such relatively soft wear plates are most desirably formed of materials having advantages as regards non-scoring and other physical characteristics not possessed by metal plates. Such materials include certain plastics, one widely used material for this purpose being a laminated fabric impregnated with the plastic material known in the trade as "Formica."

It has also been found that an eminently satisfactory way construction is achieved by cementing such plastic wear plates directly to a buttressing surface on one of each pair of complementary machine tool ways so that the wear plates become virtually integral parts of the way. Such a bonding construction possesses many structural advantages over the previously employed mechanical attaching means, such as pins, countersunk screws, and clamp plates.

However, experience has shown that the cement or glue layer between the wear plates and the buttressing surface of the machine tool way must be of some appreciable thickness in order to insure the formation of an adequate bond as between these parts. Moreover, in view of the total pressure required to take any bend or warp out of the plastic wear plates, it is found that the force exerted on the freshly glued assembly tends to squeeze out the glue in some areas, resulting in a thin or "starved" glue line along some portions of the interface. Such a "starved" glue line is indicative of an uneven distribution of cement between the surfaces of the wear plates and the associated buttressing way. Correspondingly uneven bonding between these parts (some portions of the wear plates are not so firmly bonded to the buttressing way) results and the wear plates are susceptible to buckling with respect to the way or even separating entirely from the way.

Accordingly, one object of the invention is to provide an improved method of making a machine tool way structure by bonding wear plates to a machined buttress surface which includes the step of placing separate thin spacing elements so as to support the wear plates uniformly from the machined surface and thus obtain a bond joint therebetween of uniform thickness over the entire bonding area.

Another object of the invention is to provide means for positively controlling the thickness of the bond joint to facilitate maintenance of sufficient cement between the parts. Such a thickness controlled cement joint assures formation of a solid, strong bond as between any of a variety of different plastic materials and the metal base.

A more detailed object of the invention is the provision of means for assuring a mechanical minimum spacing between non-metallic wear plates and the metal base to which they are bonded. In this respect it is also an object to provide a minimum spacing arrangement as between the wear plates and their metal base such that neither the gluing pressures employed nor the distribution of these forces over the surface of the wear plates is critical, and no close control of these variables is necessary.

Another and equally important object of the invention is to provide a new and improved method of making sliding ways for machine tools.

Other objects and advantages will become apparent from the following description taken together with the accompanying drawings, wherein:

Figure 1 is a fragmentary end elevation of a machine tool having slidable parts equipped with an illustrative embodiment of the invention.

Fig. 2 is an enlarged fragmentary transverse section of the central guide and support way of the translatable machine member showing the attachment of wear plates to the way.

Fig. 3 is a further enlarged fragmentary longitudinal section taken along the line 3—3 in Fig. 2, showing one form of the minimum spacing means employed in practicing the invention.

Fig. 4 is a fragmentary plan view taken along the line 4—4 in Fig. 3.

Fig. 5 is a plan view of one of the wear plates employed in practicing the invention, showing a typical arrangement over the length of the plates of the spacing means illustrated in Figs. 3 and 4.

Fig. 6 is a plan view of a fragment of one of the wear plates, showing a modified form of the spacing means employed therewith.

Fig. 7 is a perspective view, partly in section, showing a wear plate embodying still another form of the invention.

Fig. 8 is a vertical sectional view taken along the line 8—8 in Fig. 7.

Fig. 9 is a perspective view of a gib embodying the invention.

While the invention is susceptible of various modifications and alternative constructions, certain illustrative embodiments have been shown in the drawings and will be described below in considerable detail. It should be understood, however, that there is no intention to limit the invention to the specific forms disclosed, but on the contrary the intention is to cover all modifications, methods, alternative constructions, and equivalents falling within the scope of the invention as expressed in the appended claims.

Turning now to the drawings, there are shown complementary ways 10, 11 of a machine tool 12, in this case a horizontal boring, drilling, and milling machine. As illustrated, the ways comprise a central guide and support way 10 and two parallel support ways 11, disposed under the machine base 13 and extending longitudinally along the runway 14. From Figs. 1 and 2 it will be seen that the guide and support way 10 comprises one or more plastic wear plates 16 attached to a flat horizontal buttressing surface 17 provided on the movable base 13. The resulting structure forms a downwardly facing support bearing surface 19 complemental to an upwardly facing bearing surface 20 defined on an elongated rail 21 formed integrally with the runway 14.

In practice the movable base 13 is formed as a casting and the bottom surfaces thereof are rough planed and then finish planed with a suitable flat nose tool to provide accurately finished buttressing surfaces 17. The plastic wear plates 16 are bonded to the buttressing surface 17 by a suitable cement, the coherence established between the buttressing surface and the wear plates causing the plates to become, in effect, an integral part of the movable machine base 13. Preferably, the wear plates are formed from rigid, molded strips of laminated fabric impregnated with a thermo-setting phenol-formaldehyde plastic compound, such as that commonly known as "Formica." However it will be understood that many synthetic resinous materials whether laminated, filled, etc. may be employed in practicing the invention. The strips are preformed or cut to a width generally equal to the bearing surfaces 19, 20 of the ways and are prepared for installation by being cleaned on the side to be cemented to the buttressing surface 17. As disclosed in the above-mentioned U.S. Patent No. 2,675,276, a suitable cleaning agent which may be used for this purpose and also for cleaning the buttressing surface 17, is trichlorethylene.

A cement which has been used for this purpose with very satisfactory results is a synthetic thermosetting resin adhesive of the phenol resin chemical type. A commercially available cement of this character is sold by the Cycleweld Division of Chrysler Corporation under the trade name "Cycleweld." The type of this cement most suitable for the purposes of the present invention is designated by the manufacturer as "C-14" and is prepared for use by mixing one hundred parts of one ingredient, known as "C-14A," with seven parts of a second ingredient, known as "C-14B." The cement thus prepared is applied to the surfaces to be bonded to each other within approximately twenty minutes after the ingredients are mixed.

In carrying out the invention, provision is made for maintaining a minimum distance between the wear plates 16 and the buttressing surface 17 to which the plates are bonded, thus assuring a uniform cement thickness between these parts. This is done by providing a plurality of thin spacer strips or shims 24 which are interposed between the wear plates 16 and the buttressing surface 17 at spaced intervals and remain permanently in place when a tight cement bond is formed between the parts. The strips 24 are placed sufficiently close together to prevent bending of the wear plates 16 and to thus insure a uniform cement bond thickness, and yet far enough apart to allow sufficient bonding surface therebetween.

As shown in Figs. 3, 4 and 5 the spacers 24 take the form of elongated members formed of metal foil or the like and preferably provided on one side thereof with an adhesive surface. In this way, the spacers 24 are pressure sensitive and may be quickly and easily made to adhere to the surfaces of the wear plates 16 or the buttressing surface 17. A wooden roller or the like may be passed over the spacers 24 when they are in place to assure secure adhesion. The illustrative pressure sensitive strips 24 are about .005 inch thick and are sold by Minnesota Mining & Manufacturing Company, being designated by the manufacturer as No. 425.

After cleaning the wear plates 16 and the buttressing surface 17 with the cleaning agent, a plurality of spacers 24 are adhesively joined to the wear plates at suitable intervals therealong. As shown in Figs. 3, 4 and 5, the strips 24 are evenly spaced in parallel relation across each wear plate 16. It is of course understood that the spacers may be arranged over the surface of the wear plates in any manner designed to effect the spacing action. Thus, the spacers may be arranged lengthwise with the wear plates or at any convenient angle therewith.

Cement is then applied to both the plates 16 and the buttressing surface 17 whereupon the plates are set in place along the surface 17. Usually the plates 16 are arranged along the buttressing surface 17 in end-to-end abutting relation although they may be spaced apart if desired. Pressure is applied by weights, clamps or the like to unite the parts by a solid and substantially uniform cement bond. The parts thus coated with cement and spaced apart by the strips 24 are preferably held together under pressure at room temperature to cure for sixteen to eighteen hours.

After curing of the cement, every portion of the plastic wear plates 16 is solidly held against the buttressing surface 17 so that the plate becomes virtually an integral part of the buttressing member. At the same time, the pressure required to take any bend or warp out of the plastic plates 16 has not resulted in squeezing out the freshly glued assembly due to the minimum spacing action of the spacers 24. The resulting way structure is found to be exceedingly strong due to the completeness and uniformity of the cement bond. It is found in practice that the thickness of the resulting glue line varies over a relatively narrow range, the cement being .006 to .008 inch thick in all bonded areas.

As mentioned previously, it is preferred to machine the buttressing surface 17 to the precise smoothness desired prior to applying the wear plates and then to use wear plates 16 having closely controlled uniform thickness characteristics. The resulting way surface thus conforms to finish dimensions without the necessity for further planing operations. In practice, the finished surface 19 of the wear plates 16 is then hand scraped with a suitable flat nose tool to improve the bearing characteristics of the mating way surfaces 19, 20.

While the description has thus far been directed to the horizontal bearing surfaces of the central guide and support way 10, it will be understood that the invention may be used advantageously in a wide variety of applications. To demonstrate more fully the scope of utility of the invention as employed in machine tool ways, attention is drawn to the vertical bearing surfaces of the elongated rail 21 and the corresponding surfaces provided by the machine base 13. As shown in Figs. 1 and 2, one or more vertically disposed wear plates 26 are cemented using spacers 24 (not shown) to one vertical buttressing surface 27 of the machine base 13 to define a longitudinal guide surface 28. The guide surface 28 is held in sliding engagement with a complementary guide surface on the rail 21 by an adjustable gib 29 suitably fastened to the base 13 in position to engage the opposite side of the rail. The gib 29 in this case is elongated with its front surface 30 disposed parallel to the vertical surfaces of the rail 21 and its rear surface tapered for coacting with a mating and oppositely tapered vertical surface 32 formed on the machine base 13 opposite the vertical buttressing surface 27. Thus the front surface 30 of the gib is adapted to receive thereon one or more cemented wear plates, which define another longitudinal guide surface 31 there being interposed between the surface 30 and the wear plates a plurality of spacers 24 (not shown). Final finish dimensions are imparted to the guide surface 31 by a finish planing operation and, as in the case of the horizontally disposed wear plates, the outer surfaces of the plates are hand scraped using a suitable flat nosed tool to improve the bearing characteristics. When the gib 29 carrying the cemented wear plate or plates is wedged between the machine base surface 32 and the rail 21, the longitudinal guide surfaces 28, 31 are maintained in sliding engagement with the vertical bearing surfaces of the rail.

A modified form of the spacer means is illustrated in Fig. 6 which shows a spacer sheet 34 of any suitable non-resilient material and formed in any desired pattern such that a large percentage of the sheet is removed to provide bonding area, the remainder of the sheet acting as a spacer. Thus, as shown, the spacer sheet 34 takes the form of a flat, perforated member, having large open areas to provide a correspondingly large bonding area with the remaining portions of the sheet serving to provide a minimum spacing between the wear plate 16a and a corresponding buttressing surface (not shown).

Yet another modified form of the invention is shown in Figs. 7 and 8. As here illustrated, a wear plate 16b of non-metallic material is provided with pockets either machined or rolled in to form a plurality of upstanding ribs 36 of the proper height and suitably laterally spaced along the plate to act as spacers. Alternatively, if desired, the buttressing surface 17 may be suitably machined to leave upstanding ribs therein in any convenient pattern to act as spacers. It will be appreciated of course that there are many specific spacer arrangements which might be employed in carrying out the invention. For example, a metallic substance might be electrolytically deposited on one side of a non-metallic wear plate in any suitable spacer pattern. Such a metallic deposit might be controlled to give the proper thickness so that the deposit would act as a spacer for controlling the glue line thickness.

One of the advantageous features of the invention is that neither the actual gluing pressures employed nor the distribution of the gluing forces is critical, there being no need for closely controlling the magnitude of these factors. Since the spacer means determines the minimum glueline thickness, the gluing pressure need only be sufficient to flatten out any warp or bend in the wear plates and to firmly hold them in place.

I claim as my invention:

1. A machine tool comprising a bed having a supporting way, a traveling table or the like having a way adapted to cooperate with said first way in providing a sliding support for said table or the like, one of said ways having a smooth accurately finished supporting surface and the other of said ways having a buttress surface opposing said accurately finished surface, a plurality of flat wear plates formed of synthetic resin impregnated fabric disposed in end-to-end abutting relation and rigidly secured throughout substantially their entire areas to said buttress surface by the interposition between the backs of said plates and said buttress surface of a synthetic resinous cement layer whereby said plates are immovably anchored to and solidly supported throughout their entire areas by said buttress surface so as to form in effect an integral structure, and means including a plurality of separate thin spacer elements of uniform cross section interposed between the backs of said plates and said buttress surface and arranged to support the wear plate over an area of such extent as to maintain the parts in uniformly spaced relationship, so that a uniform cement thickness is provided in the area peripherally of said spacer elements between the parts, the exposed surfaces of said plates providing a continuous surface complemental to said accurately finished way surface and adapted to slide thereon.

2. A machine tool comprising a bed having a supporting way, a traveling table or the like having a way adapted to cooperate with said first way in providing a sliding support for said table or the like, one of said ways having a smooth accurately finished supporting surface and the other of said ways having a buttress surface opposing said accurately finished surface, a flat non-metallic wear plate rigidly secured throughout substantially its entire area to said buttress surface by the interposition between the back of said plate and said buttress surface of a synthetic resinous cement layer whereby said plate is immovably anchored to and solidly supported throughout its entire area by said buttress surface so as to form in effect an integral structure, and spacer means including a separate thin spacer element of uniform cross section also interposed between the back of said plate and said buttress surface to support the wear plate in uniformly spaced relationship with said buttress surface, so that a uniform cement thickness is provided in the area peripherally of the spacer element between the parts, the exposed surface of said plate providing a continuous surface complemental to said accurately finished way surface and adapted to slide thereon.

3. A machine tool comprising a bed having a supporting way, a traveling table or the like having a way adapted to cooperate with said first way in providing a sliding support for said table or the like, one of said ways having a smooth accurately finished supporting surface and the other of said ways having a buttress surface opposing said accurately finished surface, a plurality of flat wear plates formed of synthetic resin impregnated fabric disposed in end-to-end abutting relation and rigidly secured throughout substantially their entire areas to said buttress surface by the interposition between the backs of said plates and said buttress surface of a synthetic resinous cement layer whereby said plates are immovably anchored to and solidly supported throughout their entire areas by said buttress surface so as to form in effect an integral structure, and a plurality of separate thin elongated spacer strips of uniform cross section adhesively joined to one of said buttress and plate surfaces and evenly spaced apart for maintaining a uniform cement thickness between the plates and the buttress surface in the area peripherally of said spacer strips, the exposed surfaces of said plates providing a continuous surface complemental to said accurately finished way surface and adapted to slide thereon.

4. A machine tool comprising a bed having a supporting way, a traveling table or the like having a way adapted to cooperate with said first way in providing a sliding support for said table or the like, one of said ways having a smooth accurately finished supporting surface and the other of said ways having a buttress surface opposing said accurately finished surface, a flat wear plate formed of synthetic resin impregnated fabric rigidly secured throughout substantially its entire area to said buttress surface by the interposition between the back of said plate and said buttress surface of a synthetic resinous cement layer whereby said plate is immovably anchored to and solidly supported throughout its entire area by said buttress surface so as to form in effect an integral structure, and a separate thin spacer strip adhesively joined to one of said buttress and plate surfaces and presenting evenly spaced apart areas of support for the plate for maintaining a uniform cement thicknes between the plate and the buttress surface in the area peripherally of said spacer strip, the exposed surfaces of said plate providing a continuous surface complemental to said accurately finished way surface and adapted to slide thereon.

5. In a machine tool, a stationary member having a guideway thereon providing an elongated bearing surface, a travelling member reciprocable relatively to said stationary member and having a guideway thereon providing a complemental elongated bearing surface opposed to said stationary bearing surface, one of said bearing surfaces being smooth and accurately finished, a plurality of flat synthetic resinous wear plates disposed between said bearing surfaces and rigidly bonded to the other of said bearing surfaces in end-to-end abutting relation, means providing an adhesive bond between substantially the entire area of one surface of said plates and the opposing complemental area of said bearing surface to which said plates are bonded for so integrally uniting said plates with said last mentioned surface that the plates are solidly and immovably supported throughout substantially their entire area and are precluded from expanding and contracting longitudinally relatively to the surface to which they are bonded, and spacer means including a separate flat spacer element of uniform cross section interposed between said one surface of said plates and said bearing surface to which said plates are bonded and arranged to support the plate over an area of such extent as to maintain the surfaces in uniformly spaced relationship for maintaining a uniform adhesive thickness in the area peripherally of said spacer element between the parts.

6. In a machine tool, a stationary member having a guideway thereon providing an elongated bearing surface, a travelling member reciprocable relatively to said stationary member and having a guideway thereon providing a complemental elongated bearing surface opposed to said stationary bearing surface, one of said bearing surfaces being smooth and accurately finished, a flat non-metallic wear plate disposed between said bearing surfaces and rigidly bonded to the other of said bearing surfaces, means providing an adhesive bond between substantially the entire area of one surface of said plate and the opposing complemental area of said bearing surface to which said plate is bonded for so integrally uniting said plate with said last mentioned surface that the plate is solidly and immovably supported throughout substantially its entire area and is precluded from expanding and contracting longitudinally relatively to the surface to which it is bonded, and spacer means including separate spacer elements interposed between said one surface of said plate and said bearing surface to which said plate is bonded and arranged to support said plate over an area of such extent as to maintain the surfaces in uniformly spaced relationship for maintaining a uniform adhesive thickness in the area peripherally of said spacer elements between the parts.

7. In a machine tool, a stationary member having a guideway thereon providing an elongated bearing surface, a travelling member reciprocable relatively to said stationary member and having a guideway thereon providing a complemental elongated bearing surface opposed to said stationary bearing surface, one of said bearing surfaces being smooth and accurately finished, a plurality of flat synthetic resinous wear plates disposed between said bearing surfaces and rigidly bonded to the other of said bearing surfaces in end-to-end abutting relation, means providing an adhesive bond between substantially the entire area of one face of said plates and the complemental area of said bearing surface to which said plates are bonded for so integrally uniting said plates with said last mentioned surface that the plates are solidly and immovably supported throughout substantially their entire area and are precluded from expanding and contracting longitudinally relatively to the surface to which they are bonded, and a plurality of thin elongated strips of uniform cross section evenly spaced apart between said one face of said plates and said bearing surface to which said plates are bonded for maintaining a uniform adhesive thickness in the area peripherally of said strips between the parts.

8. In a machine tool, a stationary member having a guideway thereon providing an elongated bearing surface, a travelling member reciprocable relatively to said stationary member and having a guideway thereon providing a complemental elongated bearing surface opposed to said stationary bearing surface, one of said bearing surfaces being smooth and accurately finished, a plurality of flat synthetic resinous wear plates disposed between said bearing surfaces and rigidly bonded to the other of said bearing surfaces, means providing an adhesive bond between substantially the entire area of one face of said plates and the complemental area of said bearing surface to which said plates are bonded for so integrally uniting said plates with said last mentioned surface that the plates are solidly and immovably supported throughout substantially their entire area and are precluded from expanding and contracting longitudinally relatively to the surface to which they are bonded, and a plurality of thin elements of uniform cross section evenly spaced apart between said one face of said plates and said bearing surface to which said plates are bonded for maintaining a substantially uniform adhesive thickness in the area peripherally of said elements between the parts.

9. In a machine tool, a stationary member having a guideway thereon providing an elongated bearing surface, a travelling member reciprocable relatively to said stationary member and having a guideway thereon providing a complemental elongated bearing surface opposed to said stationary bearing surface, a gib for holding said bearing surfaces in place with respect one to the other, said gib comprising an elongated wedge shaped element, a flat wear plate rigidly bonded to said element and adapted to bear against the guideway of said stationary member, means providing an adhesive layer forming a bond between the entire area of one face of said plate and the complemental area of said wedge shaped element to which said plate is bonded for so integrally uniting said plate with said last mentioned surface that the plate is solidly and immovably supported throughout substantially its entire area, and spacer means comprising a separate member interposed between said one face of said plate and said element to which said plate is bonded and extending over an area of such extent as to maintain uniform spacing of the parts, so as to produce a uniform adhesive thickness peripherally of said area between the parts.

10. In a machine tool, a stationary member having a guideway thereon providing an elongated bearing surface, a travelling member reciprocable relatively to said stationary member and having a guideway thereon providing a complemental elongated bearing surface opposed to said stationary bearing surface, a gib for holding said bearing surfaces in place with respect one to the other, said gib comprising an elongated wedge shaped element, a flat synthetic resinous wear plate rigidly bonded to said element and adapted to bear against the guideway of said stationary member, means providing a resinous type adhesive bond between the entire area of one face of said plate and the complemental area of said wedge shaped element to which said plate is bonded for so integrally uniting said plate with said last mentioned surface that the plate is solidly and immovably supported throughout substantially its entire area, and a plurality of separate flat spacer strips interposed between said one face of said plate and said element to which said plate is bonded for maintaining a uniform adhesive thickness between the parts peripherally of said strips.

11. The method of making a machine tool way structure for a pair of relatively slidable machine tool elements, which comprises accurately finishing a metal way surface on one of said elements, finishing on the other of said elements a buttress surface generally complemental to said way surface, providing a wear plate of synthetic resinous material of such flexibility as to require support to maintain a desired form and which may have initial warps or bends resulting in deviations from the desired form, interposing spacer means comprising separate flat spacer elements of predetermined thickness between said buttress surface and said wear plate, introducing between said wear plate and said buttress surface a substantially continuous layer of synthetic resin adhesive, applying pressure against said plate forcing the latter toward said buttress surface during the setting of said adhesive to remove any warps or bends from the plate and to conform the plate with the buttress surface, and to form an adhesive layer of uniform thickness in the area peripherally of said spacer elements to rigidly bond said plate to the supporting buttress surface, said spacer means giving support to the flexible plate over an area of such extent as to maintain a uniformly spaced relationship between the plate and the buttress surface during the application of said pressure, and drying said adhesive while maintaining said pressure.

12. The method of making a machine tool way structure for a pair of relatively slidable machine tool elements, which comprises accurately finishing a flat metal way surface on one of said elements, finishing on the other of said elements a buttress surface generally complemental to said way surface, placing a molded synthetic resinous wear plate of uniform, accurately controlled thickness adjacent said buttress surface, said wear plate being of such flexibility as to require external support to maintain it flat, interposing thin spacer elements between the opposing surfaces of said wear plate and said buttress, bonding said wear plate to said buttress surface by introducing therebetween a substantially continuous layer of synthetic resin adhesive, and pressing said plate toward said buttress surface during the setting of said adhesive to rigidly bond said plate throughout substantially its entire area to the supporting buttress surface, said spacer strips giving support to the wear plate over an area of such extent as to maintain a uniformly spaced relationship between the plate and the buttress surface with an adhesive layer of uniform thickness in the area peripherally of said spacer elements so that the outer face of said wear plate after such bonding forms a continuous, flat and smooth surface accurately complemental to said finished way surface.

13. The method of making a machine tool way structure for a pair of relatively slidable machine tool elements, which comprises accurately finishing a metal way surface on one of said elements, finishing on the other of said elements a buttress surface generally complemental to said way surface, placing a plurality of separate thin spacer elements at intervals along said buttressing surface, bonding a plurality of molded synthetic resinous wear plates to said buttress surface in end abutting relation to one another by introducing between said wear plates and said buttress surface a substantially continuous layer of synthetic resin adhesive, pressing said plates toward said buttress surface during the setting of said adhesive to force said adhesive into a layer of uniform thickness peripherally of said spacer elements thereby to rigidly bond said plates to the supporting buttress surface, said plates being of such flexibility as to require external support provided by said spacer elements which maintain the plates in a uniformly spaced relationship with the buttress surface upon the pressure application, and drying said adhesive.

14. The method of making a gib for use in a machine tool, which comprises finishing a flat buttress surface on a plate element, providing a synthetic resinous wear plate, said wear plate being of such flexibility as to require external support to maintain it flat, interposing spacer means between said buttress surface and said wear plate, introducing between said wear plate and said buttress surface a substantially continuous layer of synthetic resin adhesive, pressing said plate toward said buttress surface during the setting of said adhesive to rigidly bond said plate throughout substantially its entire area to the supporting buttress surface, said spacing means giving support to the wear plate over an area of such extent as to maintain a uniformly spaced relationship between the plate and the buttress surface, and machining the outer face of said wear plate after such bonding to form a continuous, flat and smooth bearing surface thereon.

15. The method of making a gib for use in a machine tool, which comprises finishing a flat buttress surface on a plate element, providing a synthetic resinous wear plate, said wear plate being of such flexibility as to require external support to maintain it flat, interposing a plurality of thin, flat spacer strips between said buttress surface and said wear plate, introducing between said wear plate and said buttress surface a substantially continuous layer of synthetic resin adhesive, pressing said plate toward said buttress surface during the setting of said adhesive to rigidly bond said plate throughout substantially its entire area to the supporting buttress surface, said spacer strips giving support to the wear plate over an area of such extent as to maintain a uniformly spaced relationship between the plate and the buttress surface and drying said adhesive.

References Cited in the file of this patent

UNITED STATES PATENTS

| 2,593,230 | Walter | Apr. 15, 1952 |
| 2,637,995 | Mann | May 12, 1953 |
| 2,638,430 | Mann | May 12, 1953 |
| 2,675,276 | Daugherty | Apr. 13, 1954 |
| 2,707,694 | Standring | May 3, 1955 |

FOREIGN PATENTS

| 524,124 | Great Britain | Jan. 30, 1940 |